Sept. 15, 1936.     L. DE FLOREZ     2,054,120
PYROMETRIC DEVICE
Filed Jan. 8, 1931     3 Sheets-Sheet 1
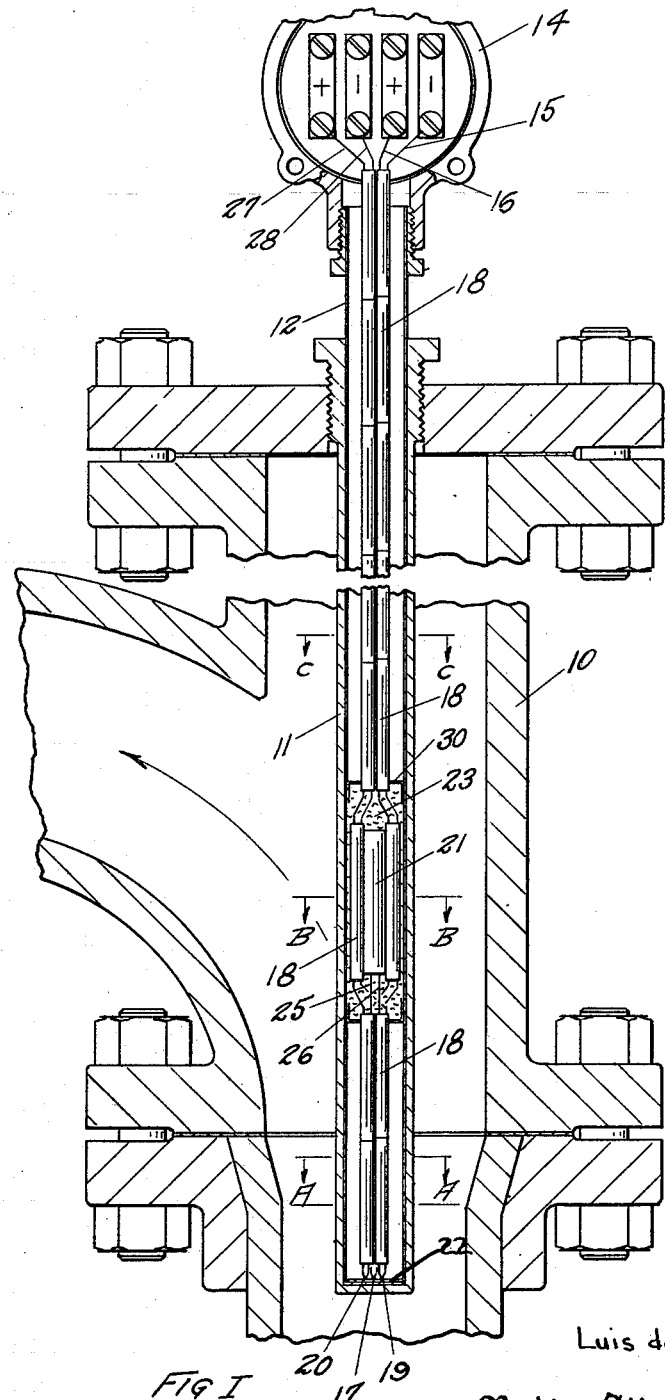
FIG I
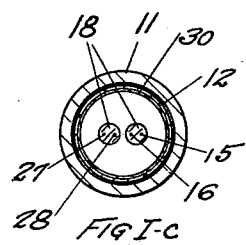
FIG I-C
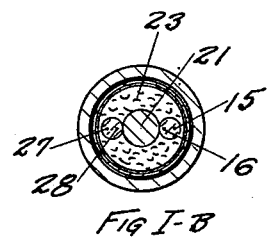
FIG I-B
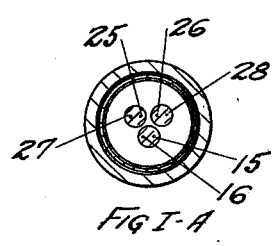
FIG I-A
Luis de Florez Inventor
By his Attorneys

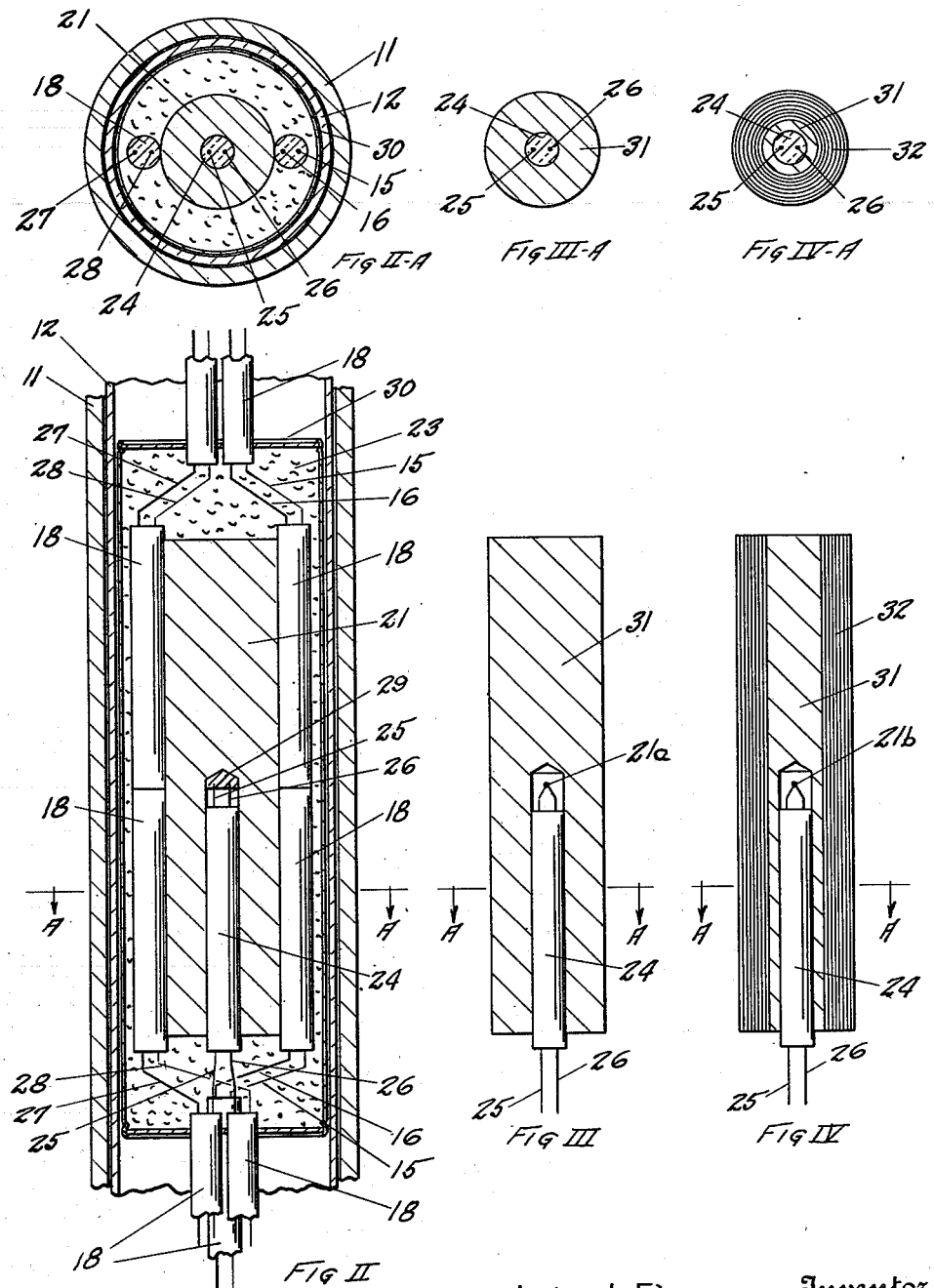

Sept. 15, 1936.    L. DE FLOREZ    2,054,120
PYROMETRIC DEVICE
Filed Jan. 8, 1931    3 Sheets-Sheet 3
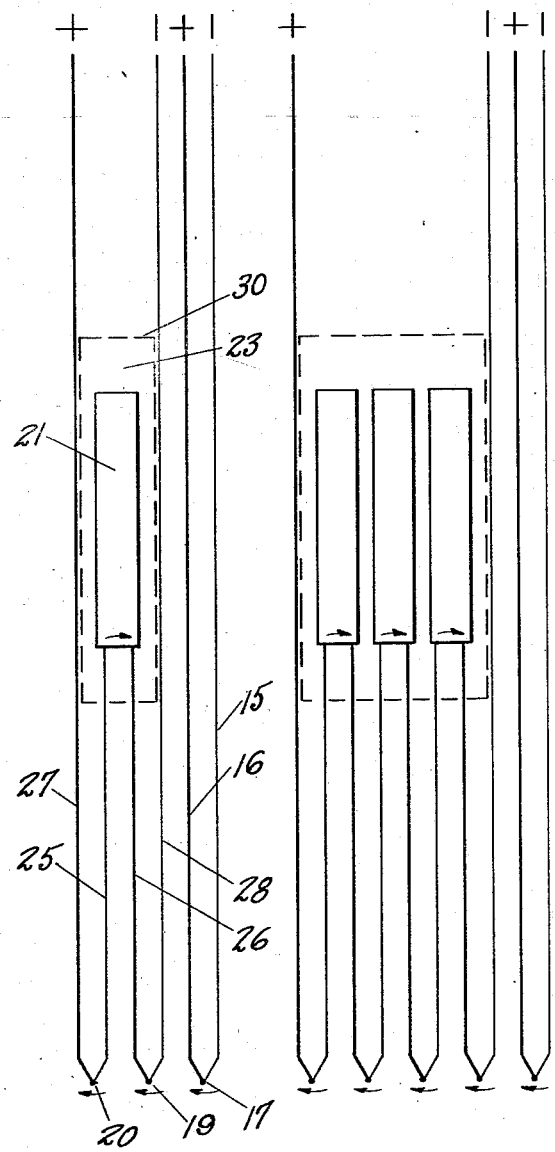
FIG V    FIG VI
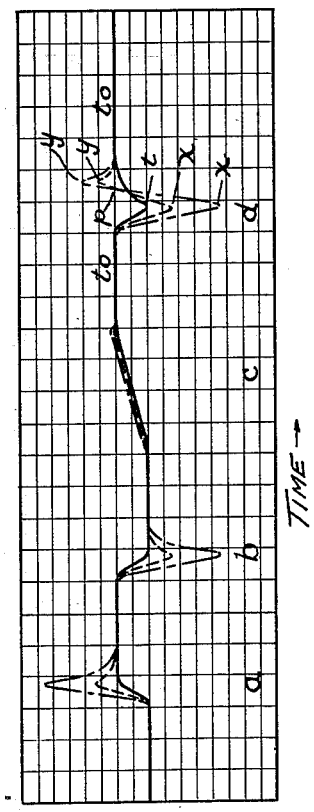
NET E.M.F.
FIG VII
Luis deFlorez  Inventor
By his Attorneys
Hogue & Neary Patented Sept. 15, 1936

2,054,120

UNITED STATES PATENT OFFICE 2,054,120

PYROMETRIC DEVICE

Luis de Florez, Pomfret, Conn.

Application January 8, 1931, Serial No. 507,426

5 Claims. (Cl. 73—32)

This invention relates to pyrometric devices, and relates more particularly to an improvement in pyrometric devices of the character described in my Patent No. 1,837,853, granted December 22, 1931.

More specifically, the present invention provides a pyrometric device that will, under the influence of the temperature in an adjacent system, indicate primarily the relative rate at which changes occur in the temperature in such system, and secondarily, the true value of the temperature in the adjacent system when said system is in a state of equilibrium. The pyrometric device of my invention may therefore be described as a multiple effect or compound pyrometric device, since it performs more than one desirable function. Wherever the terms "multiple effect" and "compound" are used herein, they are used to designate pyrometric devices capable of thermo-electric response to temperature and temperature changes such that the use of the device is not limited either to the indication of actual instantaneous temperature values or to the indication of temperature changes and the rate thereof.

The practical adaptation of such a device makes desirable compact and sturdy construction in a form convenient for use in industrial vessels and conduits. It is further necessary that the sensitivity of the device with respect to temperature changes be unimpaired by the construction thereof in commercial form. In this connection the pyrometer should be capable, at a time of temperature change in either direction, of responding quickly to the change and of reflecting such change in sufficient magnitude to permit the use of commercial measuring and control instruments and apparatus in conjunction therewith. In addition to being supersensitive to changes in process temperature, such a pyrometer should further be capable of accurately measuring a constant temperature throughout a period of thermal equilibrium.

A simple form of device having the aforementioned characteristics is a pyrometer comprising a metallic sheath encasing a compound or multiple effect thermo-couple which has three junctions responsive, in operation, to the influence of the process temperature. Two of these (which may conveniently be called the hot junctions) are located at the inner or closed end of the thermo-couple sheath, while the third (or intermediate junction) is placed at some point intermediate the length of the sheath. The three junctions are connected in series, with the intermediate junction between the two hot junctions in the electric circuit, and the novel characteristics of the pyrometer are in part due to this electrical relationship. Its outstanding utility in connection with industrial pyrogenic processes is, however, largely and more specifically due to the construction of the intermediate thermo-couple junction. This junction is of very large mass relative to the mass of the hot junctions and is surrounded, within the sheath, with thermal insulation. The full electrical response of this intermediate junction to a change in the process temperature is thereby delayed, while the response of the hot junctions at such a time will be relatively instantaneous. Thus the net E. M. F. of the compound couple, during a period of temperature change, will occasion a temperature indication which will be enhanced in value to a degree substantially proportional to the rate of such change, while during a period of thermal equilibrium the net E. M. F. of the compound couple will cause a temperature indication substantially corresponding to the constant process temperature.

It will be noted that the successful operation of a compound thermo-couple in the manner hereinbefore set forth depends primarily upon delaying the full response of the intermediate junction to the influence of the process temperature relative to the response of the hot junction, to the same change of temperature. The desired time interval between the response of the hot junctions and that of the intermediate junction will be largely controlled by the requirements of the industrial process to which the pyrometer is adapted. Therefore, it is desirable that such pyrometers should permit of sufficient flexibility in design and construction without materially affecting the overall size of the device, as will permit of the specific adaptation of a particular instrument to the peculiar needs of a particular industrial process.

In the present invention the magnitude of the temperature lag of the intermediate junction is affected primarily by three constructional factors; the relatively large mass of the junction which necessitates the absorption of an increased amount of heat in order to occasion an increase (or conversely a greater loss of heat to effect a decrease) in the temperature of the junction and thus increases the time required for the intermediate junction to fully respond to the influence of a temperature change; the thermal insulation surrounding the junction which acts to retard the flow of heat to or from the intermediate junction and consequently further increases the time required to establish thermal equilibrium between the hot junctions and the intermediate junction; and the distance between the hot junctions and the intermediate junction. This factor affects the operation by reason of the possible flow of heat from the hot junctions to the intermediate junction and thereby affects their substantially independent action. In the construction depicted in the accompanying drawings it will be noted that care is taken to thermally insulate, as far as possible, these junctions from one another in order to prevent the inter-transfer of heat either by radiation or by conduction along the thermo-couple wires. In this manner the flow of heat between the junctions is minimized, which is of importance, since it is necessary to have a relatively small distance between the respective junctions in order that all of said junctions shall be subjected to the influence of the same external temperature.

Where the intermediate junction consists merely of two small wires, as in my prior Patent No. 1,837,853, it will be apparent that the intermediate junction has only a small mass and hence only a small heat capacity. As a result, the total heat required to change the temperature of the intermediate junction is extremely small. The small but unavoidable transfer of heat along the thermo-couple wires and by radiation is therefore a considerable proportion of the total heat required to bring the intermediate junction to the temperature of the hot junctions. Consequently, the intermediate junction tends to assume the temperature of the hot junctions more rapidly than is desirable, resulting in a definite loss of sensitivity of the device as a whole. This undesirable result would be present even though the insulation were completely effective in preventing any passage of heat therethrough for the desired lag period, which of course it is not. The gradual leakage of heat through the insulation in fact accentuates this difficulty.

It will be apparent that the foregoing difficulty cannot be entirely eliminated merely by increasing the size and effectiveness of the heat insulation surrounding the intermediate junction. Moreover, such increase in the insulation would increase the size of the device to such an extent that it would seriously interfere with the flow of fluid when it is mounted in a conduit as shown in Figure I. By surrounding the intermediate junction with a relatively large mass of heat-conducting material, specifically metal, in accordance with the present invention, these difficulties can be practically entirely overcome and the sensitivity and effectiveness of the device greatly increased. This is accomplished because the increased heat capacity resulting from the large mass of heat-conducting material makes a relatively large flow of heat to or from the intermediate junction necessary in order to raise or lower its temperature materially.

In the accompanying drawings:

Figure I shows a pyrometer assembly inserted in an oil stream, and comprising a compound thermo-couple having three junctions in the process temperature, together with a simple thermo-couple electrically insulated therefrom;

Figures I—A, I—B and I—C are horizontal sections on the lines A—A, B—B and C—C respectively of Figure I;

Figure II is an enlarged sectional view of the intermediate junction section of the pyrometer in Figure I;

Figure II—A is a horizontal section on the line A—A of Figure II;

Figures III and IV show two modifications in the construction of the intermediate junction;

Figures III—A and IV—A are horizontal sections on the lines A—A of Figures III and IV respectively;

Figure V is a wiring diagram of the pyrometer assembly shown in Figure I, with the compound thermo-couple having one intermediate and two hot junctions; Figure VI is a modification of Figure V showing the wiring diagram for a compound thermo-couple having three intermediate junctions and four hot junctions; and Figure VII is a graphical representation of the thermo-electric effects obtained with pyrometric devices constructed according to this invention.

Referring to Figure I, 10 is an oil stream conduit carrying a pyrometer well 11 adapted to receive the pyrometer assembly. The latter comprises a metallic sheath 12 encasing one simple and one compound thermo-couple. A pyrometer head 14 is attached to the outer end of the metal sheath 12, and encloses the binding posts supplied for electrically connecting the several elements of the pyrometer with measuring or control instruments as desired. 15 and 16 are the primary wires of the simple thermo-couple having its hot junction 17 in contact with the inner wall of the sheath 12 at the closed end thereof. The compound thermo-couple, the construction of which is more clearly shown in Figure V, has two hot junctions, 19 and 20, located at the closed end of the thermo-couple sheath 12 and an intermediate junction 21 which, in the assembly shown, is also located in the sheath 12 at a suitable distance from the hot junctions 19 and 20. The said hot junctions of the compound couple are protected from contacting with the wall of the thermo-couple sheath by means of a layer of mica 22 disposed therebetween, and the wires comprising the several thermo-couples are electrically insulated along their lengths by threading said wires through small perforated cylinders 18 of porcelain or other non-conducting material. The intermediate junction 21, of the compound thermo-couple, is of very great mass relative to the hot junctions thereof, and the flow of heat to and from this junction is retarded by completely surrounding it with thermal insulation 23 inside the sheath. A satisfactory material for use in this connection is diatomaceous earth, the high thermal resistance of which minimizes the necessary bulk.

Referring now to Figure V, which is a wiring diagram of the pyrometer assembly shown in Figure I, 15 and 16 are wires of dissimilar materials (as, for example, iron and constantan) forming a simple thermo-couple having its hot junction at 17. The construction of such a thermo-couple, which is included in the pyrometer assembly for the purpose of providing a continuous indication of the true process temperature, with which the indications of the compound thermo-couple may be compared, is familiar to workers in the pyrometric art and thus need not be further described. The compound thermo-couple with which this invention is more particularly concerned, comprises the wires 25, 26, 27 and 28 so connected electrically as to form a thermo-couple having two hot junctions 19 and 20 and one intermediate junction 21. This compound thermo-couple is really a series arrangement of three individual thermo-couples, the net E. M. F. of which will be equivalent to the E. M. F. of a simple thermo-couple of similar materials when the three junctions 19, 20 and 21 are all at the same temperature. The wires 25 and 27 are of dissimilar metals and form a thermo-couple having its hot junction at 20. The wires 26 and 28 are also of dissimilar metals, the wire 26, however, being of the same material as the wire 27 and the wire 28 similarly being of the same metal as the wire 25, and form a second thermo-couple having its hot junction at 19. The third thermo-couple of the series comprises the wires 25 and 26 which, as has been indicated, are of dissimilar metals and has its hot junction at 21. It will be noted that the wires 25 and 26 are each common to two different thermo-couples and that the hot junction 21 of one of the individual thermo-couples forms the intermediate junction of the compound thermo-couple, while the hot junctions 19 and 20 of the remaining individual thermo-couples in the series form the hot junctions of the compound thermo-couple. The small curved arrows placed near the several junctions of the thermo-couples shown, indicate the relative direction of the generated E. M. F. of said thermo-couples. The thermo-electric reactions of these thermo-couples will be described hereinafter in connection with the operation of the pyrometer of this invention and its application to industrial work.

In Figure II an enlarged view of the intermediate section of the pyrometer shown in Figure I is presented. This figure shows in detail a convenient form of assembly for the intermediate junction of the compound thermo-couple. The intermediate junction 21 consists of a cylindrical plug of iron or steel carrying a small cylindrical porcelain insulator 24. This insulator 24 partially projects into an opening in the plug extending along the longitudinal axis thereof from the lower end to a point near its center. The wires 25 and 26 are threaded through holes in the insulator 24 and are brazed to the plug at the point 29, thus connecting the intermediate junction 21 into the thermo-couple system. While not necessary to the successful operation of the pyrometer, it is desirable that the point 29 be located at the center of gravity of the plug forming the intermediate junction 21. The size of the plug will in a specific design depend upon the desired mass of the intermediate junction as compared with the mass of the hot junctions of the compound thermo-couple.

A metal container 30, adapted to fit within the thermo-couple sheath 12, is provided to encase the intermediate junction 21, together with portions of the several thermo-couple wires and the electrical insulators therefor located in this section of the pyrometer, and has the portion of its volume, not taken up by the several elements of the pyrometer assembly, filled with diatomaceous earth for the purpose of retarding the flow of heat to and from the intermediate junction by reason of the high thermal resistance of the said material.

In Figures III and IV are shown two modifications in the construction and assembly of the intermediate junction of the compound thermo-couple. In Figure III the intermediate junction 21a is of normal size and is formed by brazing together the upper terminals of the wires 25 and 26 after threading said wires through the perforated insulator 24. The insulator 24, together with the intermediate couple carried thereby is then inserted in an opening in the iron or steel plug 31, which corresponds in size and shape to the plug forming the junction 21 in Figure II. The intermediate junction 21a in Figure III is thus completely surrounded, but not in contact with, a large mass of heat-conducting material which functions in a manner similar to the functioning of the enlarged intermediate junction 21 in Figure II in setting up a time differential between the full response to temperature changes of the hot junctions of the compound couple and the intermediate junction thereof. The plug 31 shown in Figure III may be conveniently surrounded with a suitable insulating material in a construction, for example, as shown in Figure II. It is understood of course that, in either of the two illustrated intermediate junction constructions referred to above, the thermal insulation surrounding the intermediate junction may be of any material or form most suitable for the particular pyrometer being designed and constructed. Figure IV shows a further modification of the structure depicted in Figure III wherein the iron or steel plug 31 of Figure III is somewhat reduced in size and sheet metal (or wire) 32 is wrapped circumferentially around said plug. This mode of construction introduces a third factor occasioning the retardation of the full response of the intermediate junction to changes in external temperatures, namely, the dead air spaces between the several layers of the metal wrapping 32. In this case, as in the case of the other two modifications of the intermediate junction, thermal insulation of a desired amount and form is desirably placed around the intermediate junction and heat-conducting material in the vicinity thereof. It will be noted that sheet metal wrapping as used in the structure shown in Figure IV may be conveniently applied to the intermediate junction 21 in Figure II if desired. This and other modifications of the structure shown logically concerned with the industrial use of the present invention are to be considered well within the scope thereof.

When adapted to its intended use, the pyrometer of this invention is placed in an industrial vessel or conduit in such a manner that all of the junctions of the thermo-couples are subjected to the influence of the same process temperature. The auxiliary measuring or control instruments to be connected to the pyrometer will depend upon whether indication or control of temperature is the desired function as well as upon the personal desires of the user since the device may be incorporated in any temperature indicating or control system. The characteristics of the pyrometer, however, give it particular utility in connection with automatic control of temperature, especially in processes such as the cracking of petroleum oils. These processes have certain definite time-temperature characteristics to which the pyrometer may be correlated in its design and construction, thus ensuring a degree of control commensurate with the needs of the process.

A graphical representation illustrating the thermo-electric reactions of the pyrometer is shown in Figure VII. Time is plotted against net E. M. F. of the simple and the compound thermo-couples (as in the pyrometer assembly of Figure I) and several conditions of fluctuating temperature are shown. In the figure, the solid line represents the E. M. F. corresponding to the actual process temperature, the dotted line represents the E. M. F. generated by a compound couple with one intermediate junction (as in Figure V), and the dot and dash line represents the E. M. F. generated by a compound couple with three intermediate junctions (as in Figure VI). It will be noted that the broken lines merge with the solid line during periods of thermal equilibrium and that the degree of magnification, at a time of temperature change, indicated by the E. M. F. of a compound couple, is increased by increasing the number of junctions of such couple. The time interval over which such magnification extends is dependent upon the construction of the intermediate junction and the thermal insulation thereof.

When the pyrometer is functioning merely as an indicating and/or recording device, the sections of Figure VII marked "a", "b", and "c" respectively illustrate its performance under various process temperature conditions. At "a" an abrupt increase in process temperature to a new constant level is represented which is measured by the simple thermo-couple along the solid line of the figure. Since the full response of the intermediate junction of the compound couple is delayed, this couple indicates a magnification of this temperature change, along the broken line, which magnification, being proportional to the rate of such change, is of high degree since the change occurred abruptly. The net E. M. F. of the compound couple gradually approaches a value corresponding to the new temperature level after the predetermined time interval has passed due to the establishment of thermal equilibrium between the several junctions of the compound couple. At "b" the response of the pyrometer to an abrupt process temperature change in the opposite direction is represented while at "c" a more gradual change in process temperature is illustrated, the magnified net E. M. F. of the compound couple being lower in degree in accordance with the slower rate of the temperature change.

Section "d" of Figure VII illustrates the functioning of the multiple effect pyrometer in conjunction with an automatic temperature control system regulating some temperature controlling operation factor, such as fuel supply. In passing it may be noted that the ordinates of Figure VII may be considered as representing temperature values as well as net E. M. F. of the thermo-couples corresponding thereto. In the figure, "to" indicates the predetermined process temperature datum level which is desired and which the control system has been set to maintain. As long as the temperature remains at this level the control system is static since all of the thermo-couples are responding fully to the same temperature. Assume now that the process temperature suddenly decreases toward the value "t". A magnified response to this change, the degree of magnification being dependent upon the rate of change, is set up in the compound couple as represented by the point "x". The fuel supply regulatory mechanism is immediately set in motion occasioning an increase in fuel supply to the unit at a time and to a degree sufficient to prevent the process temperature dropping below the point "t". The time-temperature relations of the process and process equipment, to which the pyrometer characteristics have been correlated, will determine the time interval which must elapse before the effect of the increase in fuel supply is felt at the point of temperature control. The pyrometer acts as a brain in the temperature control system and therefore partially compensates for this time interval by increasing the fuel supply more than is proportionately necessary to offset the actual temperature decrease. The amount of such over correction will depend upon the rate of the process temperature change and the capacity to over correct, and thus anticipate the return to normal of the temperature, is ascribable to the constructional characteristics of the intermediate junction of the compound thermo-couple.

As soon as the effect of the increase in fuel has been felt at the point of temperature measurement, the drop in process temperature will cease (as for example at the point "t") and start to increase toward the normal value "to". This second directional change will occasion a magnified response in the compound couple opposite in direction to the first magnified response and of a degree proportional to the rate of the new temperature change. The final indication of this magnified response is represented by the point "y". At this point the magnified response of the compound couple begins to gradually recede since the rate of temperature change is now more gradual. It should be appreciated that all of the broken curve below the datum line may be taken to show the increase in quantity of fuel, the rate of increase of the fuel being proportional to the extent of departure of the curve from the datum line. The broken curve above the datum line then may be taken to indicate a decrease in the amount of fuel and the rate of decrease being proportional to the departure of the curve above the datum line. Thus the curve indicates that a decrease in the fuel supply is initiated at the point "p" before the process temperature has been raised to its datum level as indicated by the solid line. The gradual merging of the broken lines with the solid line represents the final effect of the pyrometer "brain" in directing the automatic temperature control system in its regulatory operation whereby the temperature is brought back to normal without the occurrence of the familiar phenomenon of "hunting" common to all temperature control systems under present practice in the art.

I claim:

1. A pyrometric device adapted to form part of a multiple effect pyrometer and comprising a sheath, an odd number of hot and intermediate thermo-electric junctions connected alternately in series within said sheath, there being one less intermediate junction than the number of hot junctions, all of said junctions being located in the same temperature measurement zone but the hot and the intermediate junctions being spaced apart, and a metallic body having relatively high heat absorbing capacity closely surrounding each intermediate junction within and spaced from said sheath, said body being of great mass as compared to the mass of said hot junctions.

2. A pyrometric device adapted to form part of a multiple effect pyrometer and comprising an odd number of hot and intermediate thermo-electric junctions connected alternately in series, there being one less intermediate junction than the number of hot junctions, all of said junctions being located in the same temperature measurement zone but the hot and the intermediate junctions being spaced apart, a metallic body of heat-absorbing material closely surrounding each intermediate junction and being in intimate contact therewith, said body being of great mass as compared with the mass of said hot junctions, and thermal insulation surrounding said metallic heat-absorbing body.

3. A pyrometric device adapted to form part of a multiple effect pyrometer and comprising an odd number of hot and intermediate thermo-electric junctions connected alternately in series there being one less intermediate junction than the number of hot junctions, all of said junctions being located in the same temperature measurement zone but the hot and the intermediate junctions being spaced apart, a body of metal closely surrounding each intermediate junction but not in contact therewith, and thermal insulation surrounding said metal body.

4. A multiple effect pyrometer which comprises a thermo-couple sheath, a compound thermo-electric couple having a plurality of hot junctions and at least one intermediate junction encased therein, said intermediate junctions being spaced from said hot junctions, material for delaying the full thermo-electric response of said intermediate junctions, said material consisting of a metallic portion and a refractory portion and being disposed within said sheath surrounding the said intermediate junctions, said metallic portion being adjacent the intermediate junctions but not in contact therewith, said refractory portion surrounding the said metallic portion, and means for connecting auxiliary instruments to said multiple effect pyrometer.

5. A pyrometric device adapted to form part of a multiple effect pyrometer comprising a sheath, a container located within said sheath, a mass of refractory insulating material located within said container, an odd number of hot and intermediate thermo-electric junctions connected alternately in series by current conducting wires within said container, there being one less intermediate junction than the number of hot junctions, all of said junctions being located in the same temperature measurement zone but the hot junctions being located in close proximity with one end of said container and the intermediate junctions being located toward the center of said container, a metallic body having relatively high heat absorbing capacity located within said mass of insulating material and surrounding each intermediate junction and being in intimate contact therewith, and a plurality of tubular insulating members surrounding each of said current conducting wires.

LUIS DE FLOREZ.